(12) United States Patent
Bundy et al.

(10) Patent No.: US 9,255,658 B2
(45) Date of Patent: Feb. 9, 2016

(54) CONNECTION DEVICE

(75) Inventors: Gabriel Bundy, Timisoara (RO);
Thomas Fallscheer, Stuttgart (DE);
Thomas Pröttel, Esslingen (DE)

(73) Assignee: Mahle International GmbH (GB)

( * ) Notice: Subject to any disclaimer, the term of this patent is extended or adjusted under 35 U.S.C. 154(b) by 932 days.

(21) Appl. No.: 13/510,551

(22) PCT Filed: Jun. 29, 2010

(86) PCT No.: PCT/EP2010/059197
§ 371 (c)(1),
(2), (4) Date: Aug. 6, 2012

(87) PCT Pub. No.: WO2011/060968
PCT Pub. Date: May 26, 2011

(65) Prior Publication Data
US 2013/0127154 A1  May 23, 2013

(30) Foreign Application Priority Data

Nov. 18, 2009 (DE) .......................... 10 2009 053 695

(51) Int. Cl.
| | |
|---|---|
| *F16L 37/00* | (2006.01) |
| *F16L 37/14* | (2006.01) |
| *F16L 37/084* | (2006.01) |
| *F16L 37/098* | (2006.01) |

(52) U.S. Cl.
CPC .............. *F16L 37/14* (2013.01); *F16L 37/0842* (2013.01); *F16L 37/0987* (2013.01); *F16L 37/148* (2013.01)

(58) Field of Classification Search
CPC ....... F16L 33/084; F16L 33/14; F16L 33/148; F16L 33/0987; F16L 33/0985; F16L 37/084; F16L 37/14; F16L 37/148; F16L 37/0987; F16L 37/09857
See application file for complete search history.

(56) References Cited

U.S. PATENT DOCUMENTS

| | | | | |
|---|---|---|---|---|
| 3,532,367 A | * | 10/1970 | Roos | .............................. 285/302 |
| 3,606,402 A | | 9/1971 | Medney | |
| 4,396,210 A | * | 8/1983 | Spencer et al. | .................. 285/38 |
| 4,697,947 A | | 10/1987 | Bauer et al. | |
| 4,906,031 A | * | 3/1990 | Vyse | .............................. 285/318 |
| 5,082,390 A | * | 1/1992 | Balsells | ......................... 403/326 |
| 5,813,705 A | | 9/1998 | Dole | |

(Continued)

FOREIGN PATENT DOCUMENTS

| | | | |
|---|---|---|---|
| EP | 1845299 A1 | | 10/2007 |
| WO | WO 9748937 A1 | * | 12/1997 |

*Primary Examiner* — David E Bochna
*Assistant Examiner* — James Linford
(74) *Attorney, Agent, or Firm* — Fishman Stewart PLLC

(57) ABSTRACT

A connection device may include an insertion section having an annular outer groove. A housing may be configured to receive the insertion section and a blocking element may be configured to lock the insertion section in the housing. The blocking element may have a band-shaped core and a plurality of teeth arranged adjacent in the peripheral direction along the core. Each of the teeth may include an outer tooth section and an inner tooth section. A core profile may have a core principal direction determined by a maximum diameter. The teeth may have a tooth profile which has a tooth principal direction determined by an inner flank of the teeth lying radially on an interior of the outer tooth section and the core principal direction may be inclined with respect to the tooth principal direction.

20 Claims, 9 Drawing Sheets

(56) References Cited

U.S. PATENT DOCUMENTS

| | | |
|---|---|---|
| 6,179,347 B1 | 1/2001 | Dole et al. |
| 6,921,114 B1 * | 7/2005 | Washburn et al. ............ 285/321 |
| 2007/0246936 A1 * | 10/2007 | Jeltsch ......................... 285/319 |
| 2010/0101677 A1 * | 4/2010 | Liebel et al. .................. 138/158 |

* cited by examiner

CONNECTION DEVICE

CROSS-REFERENCE TO RELATED APPLICATIONS

This application claims priority to German Patent Application 10 2009 053 695.7 filed on Nov. 18, 2009 and PCT/EP2010/059917 filed on Jun. 29, 2010, which are hereby incorporated by reference in their entireties.

TECHNICAL FIELD

The present invention relates to a connection device for an insertion section of a tubular or pipe-shaped conduit or of a connection piece, said insertion section having an annular outer groove, having the features of the introductory clause of claim 1.

BACKGROUND

A connection device of this type is known from EP 1 845 299 B1. It comprises a housing into which the insertion section is able to be inserted. The known connection device has, in addition, a blocking element by which the insertion section, inserted into the housing, is able to be locked in the housing. For locking the insertion section in the housing, the blocking element engages into the outer groove of the insertion section and into an annular inner groove formed in the housing. Through a housing opening, the blocking element is able to be withdrawn substantially tangentially to the grooves from the latter. In addition, the blocking element is able to be pre-fitted in the inner groove and in the pre-fitted state permits, with elastic deflection, the inserting of the insertion section into the housing, wherein then the blocking element engages into the outer groove. Furthermore, in the connection device, the blocking element is secured in the pre-fitted state on the housing against a displacement in the peripheral direction.

Furthermore, in the known connection device, the blocking element is equipped with a band-shaped core and a plurality of teeth arranged adjacent in the peripheral direction along the core, which respectively have an outer tooth section interacting with the inner groove in the inserted state and have an inner tooth section interacting with the outer groove in the inserted state. These inner and outer tooth sections protrude from the core on opposite sides, wherein the core, at least between adjacent teeth has in cross-section a core profile which has a principal direction determined by a maximum diameter, whilst the teeth in cross-section respectively have a tooth profile which has tooth principal direction determined by an inner flank of the teeth lying radially on the interior. In the known connection device, the core principal direction and the tooth principal direction run parallel to each other.

Further connection devices which comprise a housing, an insertion section and a blocking element are known for example from U.S. Pat. No. 6,179,347 B1 and from U.S. Pat. No. 3,6060,402.

SUMMARY

The present invention is concerned with the problem of indicating an improved embodiment for a connection device of the type named in the introduction, which is distinguished in particular by a simplified handling and/or by an improved securing against displacement and/or by an increased load capacity or respectively reliability.

This problem is solved according to the invention by the subject matter of the independent claim. Advantageous embodiments are the subject matter of the dependent claims.

The invention is based on the general idea of arranging the teeth of the blocking element inclined in the profile with respect to the core of the blocking element. This is achieved in that the blocking element is produced so that the core principal direction is inclined with respect to the tooth principal direction. The invention makes use here of the knowledge that a bending stress of the core occurs on the inserting of the insertion section and on the transferring of tractive forces between the housing and the insertion section. By inclining the core principal direction with respect to the tooth principal direction, this bending stress can be significantly reduced, which reduces the loading of the blocking element and extends the durability of the blocking element and hence improves the reliability of the connection device.

It has proved to be particularly advantageous here to incline the core principal direction in the direction towards an axial direction with respect to the tooth principle direction, wherein also the tooth principal direction is inclined with respect to the axial direction. Preferably, the core principal direction is oriented so that it is also inclined with respect to the axial direction, wherein then the core principal direction is inclined with respect to the axial direction in the one direction, whilst the tooth principal direction is inclined with respect to the axial direction in the other direction.

In accordance with an advantageous embodiment, the blocking element can have an end section, lying on the exterior, lying on the outside of the housing in the pre-fitted state. This end section, lying on the exterior, simplifies the handling of the connection device, in particular for the withdrawing of the blocking element, i.e. for releasing the connection between housing and insertion section.

In accordance with a particularly advantageous further development, the blocking element can now have a twisted transition section between the end section, lying on the exterior, and the region running in the inner groove. In this transition section, a straightening of the principal direction of the blocking element profile takes place, starting from the core principal direction in the direction towards the end section, lying on the exterior, with respect to the axial direction. In particular, the principal direction of the blocking element profile in the end section, lying on the exterior, can extend substantially parallel to the axial direction. This twisted transition region makes possible a particularly space-saving, compact structural form for the connection device, because in particular a laminar abutting of the end section, lying on the exterior, against the housing is able to be realized.

According to another advantageous embodiment, the core can have a toothless core section extending into the inner groove, from the end section, lying on the exterior, up to the first tooth. It has been found that through the provision of such a toothless core section, the withdrawal of the blocking element for releasing the connection between the insertion section and the housing is considerably simplified.

In accordance with another advantageous embodiment, which can also represent an independent solution of the present problem, a cover can be provided on the outside of the housing, which covers at least the housing opening radially. By means of such a cover, on the one hand an inadvertent access to the blocking element can be avoided. On the other hand, the penetration of dirt through the housing opening into the grooves can be reduced. As a whole, by means of the cover, the functionality and the durability of the connection device can be improved. In accordance with advantageous embodiments, the said cover can also extend over an end section of the blocking element lying on the outside of the housing, i.e. can additionally also cover radially the said end section lying on the exterior. Hereby, the securing against inadvertent actuation of the blocking element is improved.

According to another embodiment, the securing device can have a depression arranged on the outside of the housing, into which a projection engages, which protrudes inwards from an end of the blocking element lying on the exterior. Hereby, a form fit, acting in peripheral direction, is produced between the housing and the blocking element, which positions the blocking element relative to the housing. Furthermore, the projection simplifies the manual withdrawal of the blocking element. Therefore, through this type of construction, the handling of the connection device can be improved.

According to an alternative or respectively independent solution, which can be optionally realized, and namely in addition to at least one of the features mentioned above, and for which also protection is claimed independently, at least one of the teeth can be different with respect to the other normal teeth as regards its geometry and/or as regards its alignment with respect to the core. In particular, provision can be made there that the at least one special tooth is configured or respectively arranged so that in the pre-fitted state or respectively in the inserted state it rests axially on the housing in the insertion direction of the insertion section in the inner groove. Through this proposal, it is achieved that the blocking element, during the insertion process, can not move so far with respect to the housing in axial direction, that the other or normal teeth, which protrude radially inwards from the inner groove, can protrude axially over the edge of the inner groove, which would lead to a jamming with the insertion section. The provision which is presented here therefore leads to an increased reliability of the connection device.

For example, the at least one special tooth can be configured or respectively arranged so that in the inserted state it rests on the housing with its inner tooth section in the inner groove, whilst the other normal teeth rest on the insertion section with their tooth sections exclusively in the outer groove.

In another advantageous embodiment, the outer groove can have a ramp profile transversely to the peripheral direction, which slopes down in the insertion direction of the insertion section. Hereby, a targeted alignment of the support of the blocking element is produced in the case of a tractive force load between the housing and the insertion section. This alignment counteracts a straightening of the teeth here, which would lead to a radial loading and widening of the housing.

Advantageously here the outer groove can have a depression on an end of the ramp profile lying on the interior, which depression is dimensioned so that the teeth are arranged standing freely radially with their inner tooth sections in the depression. Through this provision, it is achieved that the teeth can rest radially only in the region of the ramp profile, which additionally reduces the tendency to straightening of the teeth in the case of a tensile load. An embodiment is particularly expedient here in which the depression in the profile is dimensioned to be smaller than the inner tooth sections. It is thus prevented that the teeth can penetrate with their inner tooth sections into the depression up to the base thereof.

In another advantageous embodiment, the housing can have on the exterior at least one peripheral rib extending in peripheral direction, which leads to a significant reinforcing of the housing. Hereby, the connection device is reinforced for the tensile load. Preferably, the peripheral rib can be arranged at a free end of the housing having the insertion opening for inserting the insertion section. Preferably, at least two peripheral ribs are provided, spaced apart from each other axially, which improves the reinforcement of the housing, in particular in the region of the free end.

An embodiment is particularly advantageous, in which the inner groove is arranged axially between two such peripheral ribs. Hereby, the housing is reinforced and stabilized in a targeted manner in the region of the inner groove.

Optionally, a plurality of longitudinal ribs extending in longitudinal direction can be provided on the outside of the housing, which in particular connect respectively at least two peripheral ribs with each other. The longitudinal ribs also provide for an intensive reinforcement of the housing, in particular in the region of the inner groove.

Further important features and advantages of the invention will emerge from the subclaims, from the drawings and from the associated description of figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
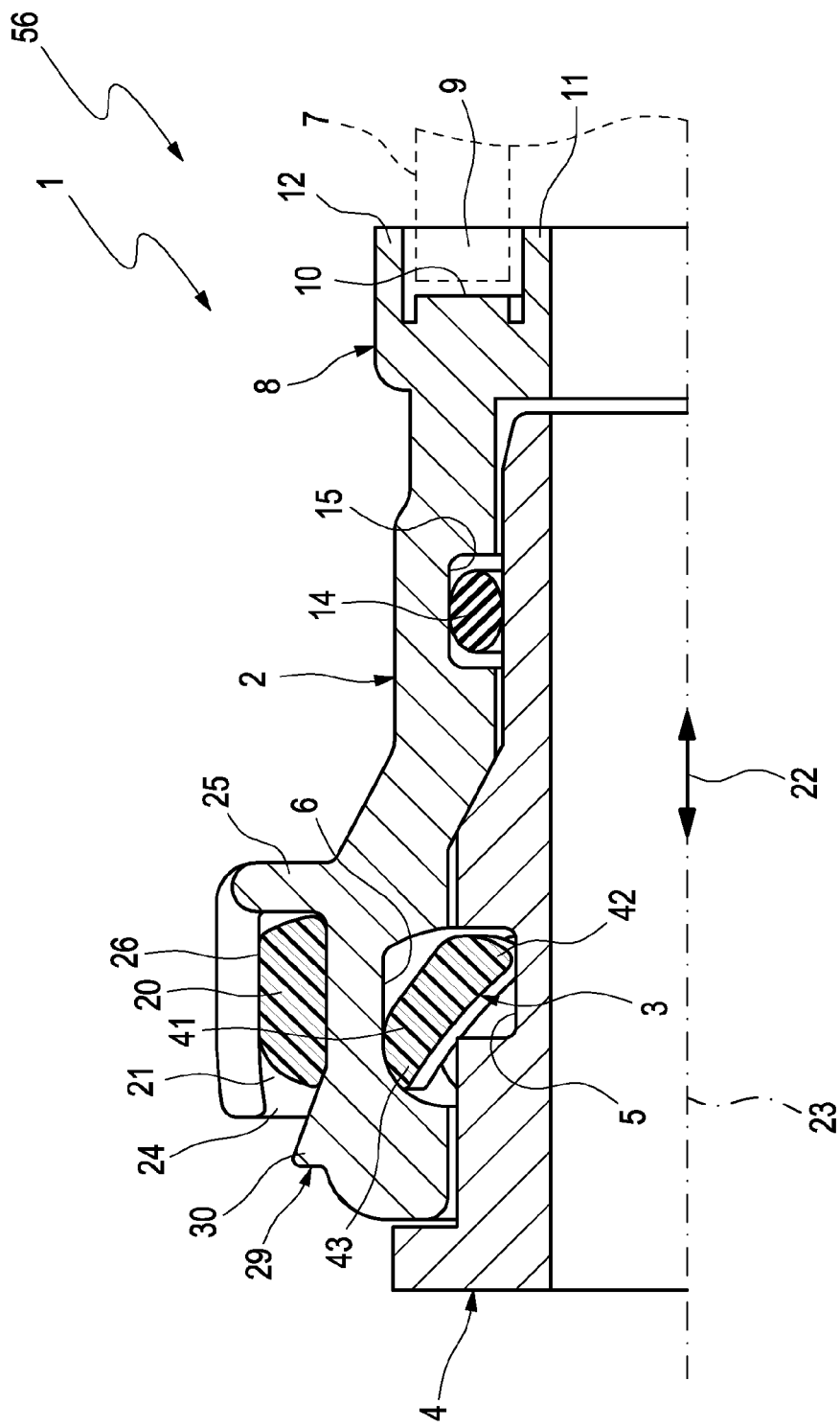
FIG. 1 a half longitudinal section of a connection device.

In accordance with FIGS. 1 to 17 and in particular with reference to FIG. 1, a connection device 1 comprises a housing 2 and a blocking element 3. The connection device 1 is provided for producing a connection for an insertion section 4. In the embodiments shown here, the insertion section 4 is configured as a connection piece. It is likewise possible to configure the insertion section 4 as a tubular or pipe-shaped conduit or as an end section of a tube or of a pipe. This insertion section 4 has an annular outer groove 5 on its outer side.

The connection device 1 preferably comes into use in motor vehicles, e.g. in a fresh air system of the vehicle for the supply of an internal combustion engine of the vehicle with fresh air. In particular, the invention therefore also relates to a fresh air system for the fresh air supply of an internal combustion engine, in particular of a motor vehicle, which is equipped with such a connection device 1.

In a special embodiment, the insertion section 4, in particular in the form of a connection piece, can be arranged, e.g. screwed, welded or clipped, on a suction module, in particular a fresh air system, or on a filter housing, in particular for air filtration, e.g. in a fresh air system. An embodiment can be particularly advantageous in which the insertion section 4, e.g. in the form of a connection piece, is formed integrally, e.g. by means of plastic injection moulding, on the suction module or on the filter housing.

The housing 2 is configured so that the insertion section 4 is able to be inserted into the housing 2. In addition, the housing 2 has an annular inner groove 6 on its inner side. The housing 2 is configured in a sleeve shape. It can be designed as a connecting piece. Likewise, it can be designed as an end piece for a tubular or pipe-shaped conduit 7, indicated by a broken line in FIG. 1.

The said conduit 7 can be designed for example as a blow-moulded part, which can be connected on the front face with the housing 2. A welded connection, in particular a friction welded connection, is suitable for example as a connection. In the example of FIG. 1, the housing is provided at its end remote from the blocking element 3 with a connection region 8, which is suitable in a particular manner for the production of a friction welded connection. In particular, this connection region 8 comprises an axial annular groove 9, which has at the base of the groove a projection 10 protruding into the groove 9, which is spaced apart both with respect to an inner wall 11 and also with respect to an outer wall 12 of the groove 9. With friction welding, this projection 10 fuses at least partially, whereby the gaps between the projection 10 and the walls 11, 12 are at least partially filled.

The blocking element 3 serves for arresting on the housing 2 the insertion section 4 which has been inserted into the housing 2. For this, the blocking element 3 engages on the one hand into the outer groove 5 of the insertion section 4 and on the other hand into the inner groove 6 of the housing 2. Furthermore, the housing 2 has a housing opening 13 which can be seen at least in FIGS. 2, 3 and 7, which penetrates the housing 2 radially. The blocking element 3 can be withdrawn through this housing opening 13 out from the inner groove 6 and the outer groove 5. By withdrawing the blocking element 3 from the connection device 1, the engaging between the insertion section 4 and the housing 2, which is brought about by means of the blocking element 3, can be eliminated, whereby the connection is disengaged and the insertion section 4 can be withdrawn from the housing 2.

The blocking element 3 is, in addition, able to be pre-fitted in the inner groove 6. This means that the blocking element 3 can be mounted in the inner groove 6 so that it also remains in the inner groove 6 or respectively on the housing 2 in the case of an absent insertion section 4. In this pre-fitted state, the blocking element 3 permits the insertion of the insertion section 4 into the housing 2. Herewith an elastic deformation or respectively deflection of the blocking element 3 is brought about and also an engaging with the outer groove 5, when the insertion section 4 reaches a designated insertion depth.

In FIG. 1 in addition a seal 14 is illustrated, which can be configured for example as an O-ring. In the example of FIG. 1, the seal 14 is inserted into a further annular inner groove 15, formed on the inner side of the housing 2, which is arranged at a distance from the inner groove 6 associated with the blocking element 3, and is positioned between the said inner groove 6 and the connection section 8.

Figure 2:
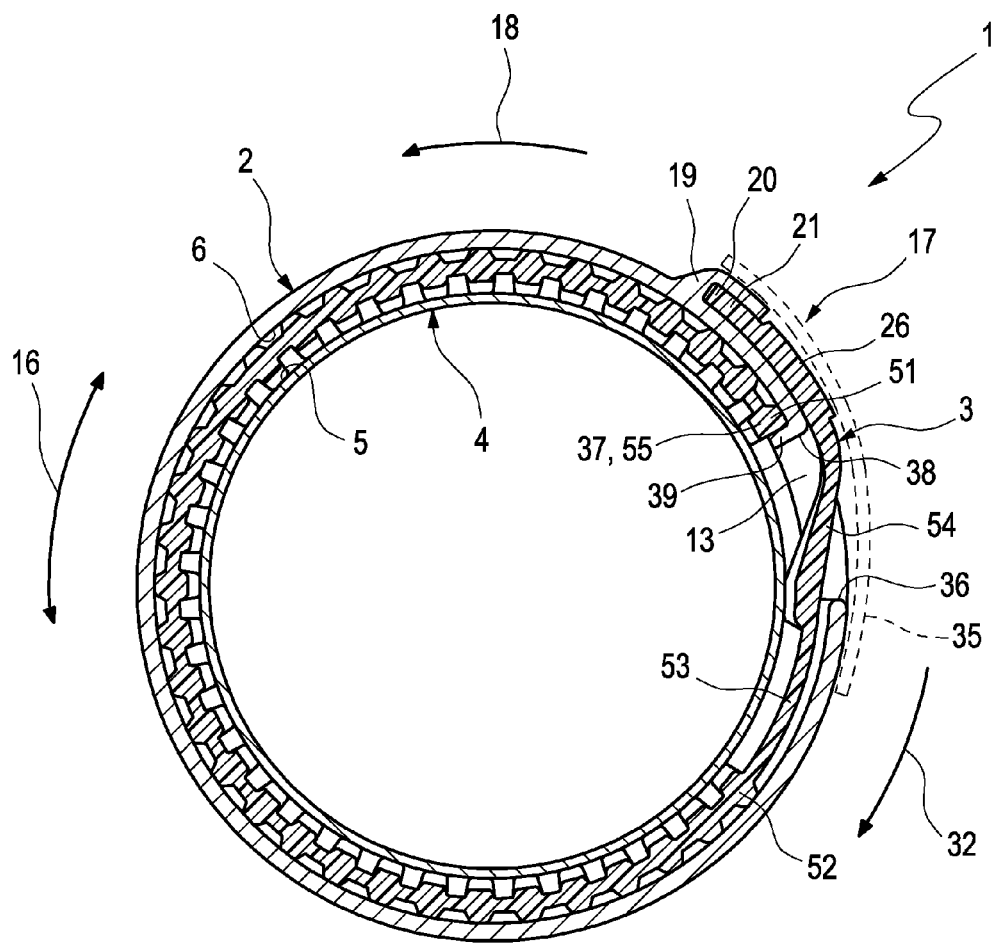
FIG. 2 a cross-section of the connection device in the region of a blocking element, FIG. 3 a perspective view of a housing of the connection device, FIG. 4 a perspective view of the blocking element, FIG. 5 a cross-section of the connection device in the region of a securing device, FIG. 6 a view as in FIG. 5, but in a different embodiment, FIG. 7 a partial view as in FIG. 3, in the region of a securing device, FIG. 8 a side view of the connection device in the region of the securing device, FIG. 9 a view as in FIG. 8, but in a different embodiment, FIG. 10 an enlarged detail view of the blocking element, FIG. 11 a longitudinal section of the blocking element, FIG. 12 a cross-section of the connection device in the region of a securing device, FIG. 13 a perspective view of a housing of the connection device, FIGS. 14 to 17 longitudinal sections of the connection device in the region of a blocking element, in different embodiments.
Figure 3:
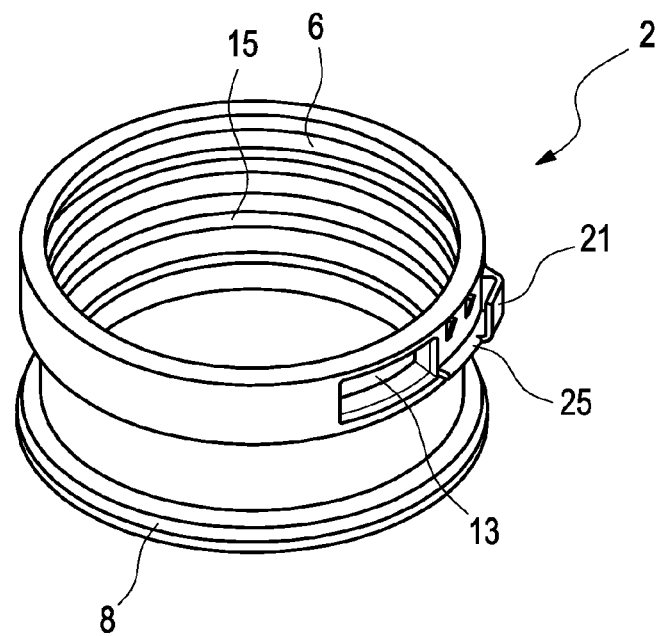

In the pre-fitted state, the blocking element 3 is secured on the housing 2 against a displacement in the peripheral direction, which is indicated in FIG. 2 by a double arrow and is designated by 16. This security against displacement of the blocking element 3 can be realized by means of a securing device 17. This securing device 17 is arranged here on the outside of the housing 2. It secures the blocking element 3 against a displacement relative to the housing 2 in the peripheral direction 16 at least in the withdrawal direction 18 indicated in FIG. 2 by an arrow.

The securing device 17 expediently comprises an outer stop 19, which is arranged on the outside of the housing 2. In the pre-fitted state, this outer stop 19 lies opposite an end 20 of the blocking element 3, lying on the exterior, in the withdrawal direction 18. The embodiment shown here is particularly expedient, in which the securing device 17 is additionally equipped with a mounting pocket 21, which is likewise arranged on the outside of the housing 2. In the pre-fitted state, the end 20 of the blocking element 3, lying on the exterior, is inserted into this mounting pocket 21. Expediently, the above-mentioned outer stop 19 can be constructed in this mounting pocket 21. Accordingly, the end 20, lying on the exterior, lies in the pre-fitted state inside the mounting pocket 21 opposite the outer stop 19 in the peripheral direction 16.

In accordance with FIGS. 3, 5 and 7 to 9, the mounting pocket 21 is open on an axial side, in accordance with preferred embodiments. The axial direction of the connection device 1 is indicated for example in FIG. 1 by a double arrow and is designated by 22. It lies here on a longitudinal central axis 23 of the housing 2 or respectively of the device 1. Through the axially open side of the mounting pocket 21, an axial opening 24 or open axial side 24 is formed, which can be seen in FIG. 1 and which faces away, for example, from the connection section 8. The end 20 of the blocking element 3, lying on the exterior, can be inserted through this opening 24, i.e. through the open axial side 24 into the mounting pocket 21, or respectively can the withdrawn therefrom. The adjustment movement of the end 20, lying on the exterior, of the blocking element 3 for securing in the mounting pocket 21 or respectively for releasing takes place axially here, i.e. transversely to the peripheral direction 16 and hence transversely to the withdrawal direction 18. Hereby, a particularly effective securing of the blocking element 3 is realized in the pre-fitted state.

In the embodiments shown here, the mounting pocket 21 is configured so as to be closed opposite the open axial side 24, i.e., opposite the opening 24. In addition, the mounting pocket 21 is lengthened in the peripheral direction, and namely in the direction towards the housing opening 15 by means of a support web 25. In accordance with FIGS. 1, 8 and 9, in the pre-fitted state an end section 26 of the blocking element 3, lying on the exterior, which has the end 20 lying on the exterior, can come to lie axially against this support web 25. Hereby, an axial securing in position is produced for the pre-fitted state for the end section 26 lying on the exterior.

Figure 8:
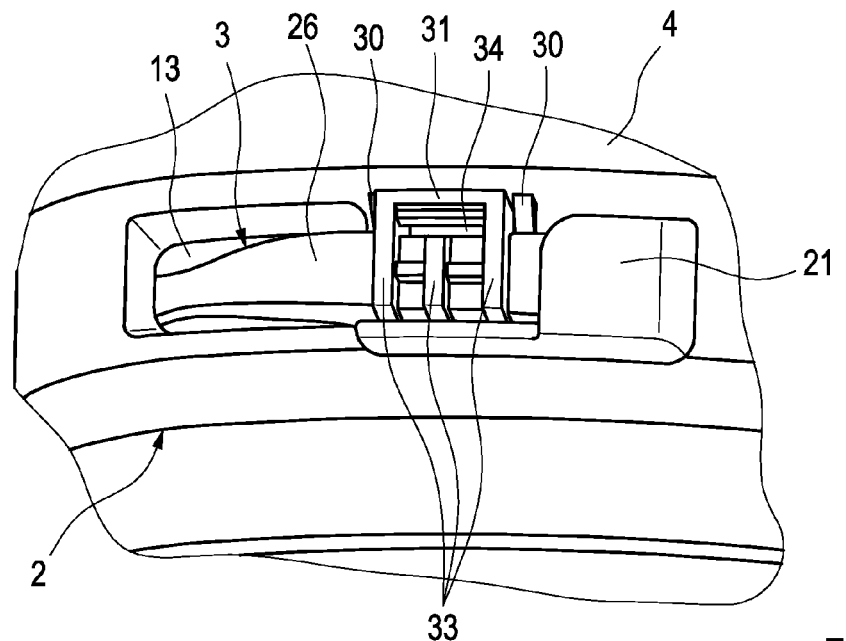
Figure 9:
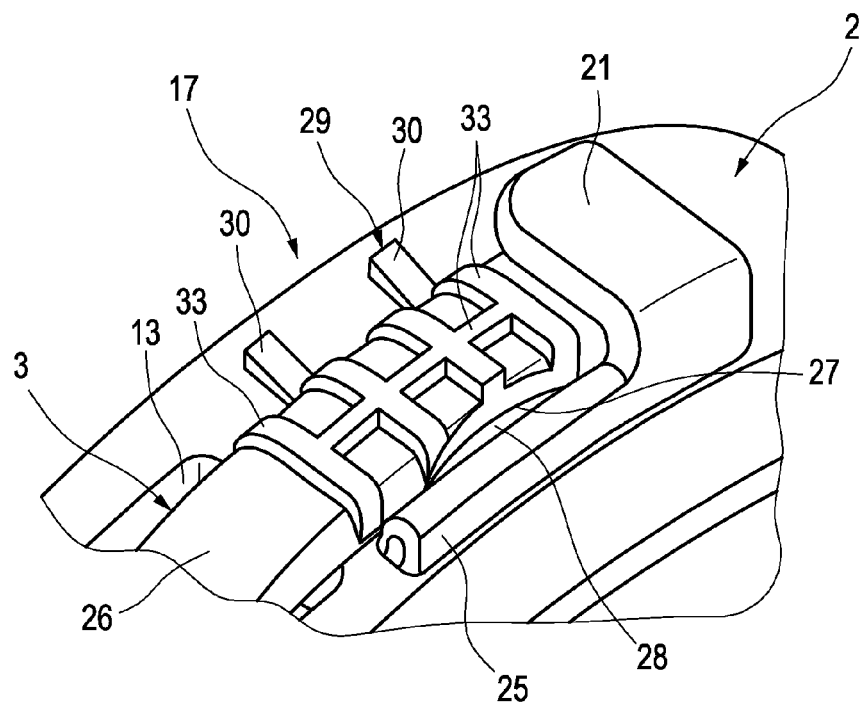

According to FIG. 8, the end section 26 lying on the exterior can come to lie substantially in a laminar manner against the support web 25. Alternatively to this, FIG. 9 shows an embodiment in which the blocking element 3 has on its end section 26, lying on the exterior, an axially oriented indentation 27, which is positioned so that in the pre-fitted state a slot 28 is formed between the end section 26 and the support web 25, which slot is dimensioned so that it can be used as a tool access. For example, a flat screwdriver can be inserted into the slot 28, in order to move the end section 26 out from the mounting pocket 21 laterally, i.e. axially, by levering or twisting.

The securing device 17 can be equipped with a detent device 29 additionally or alternatively to the features described above. This detent device 29 comprises at least one detent 30. In the embodiments shown here, respectively two such detents 30 are provided. The respective detent 30 interacts in the pre-fitted state with the end section 26, lying on the exterior, of the blocking element 3. In so doing, the respective detent 30 impedes an axial adjustment of this end section 26, lying on the exterior, relative to the housing 2. In the example, the detents 30 are configured as ramps which drop down in the direction towards the support web 25.

In accordance with the embodiment shown in FIG. 8, the blocking element 3 can have an axially projecting region 31 at its end section 26, lying on the exterior. In so far as two detents 30 are provided here, the dimension of this axially projecting region 31 and the distance between the two detents 30 can be coordinated with each other so that in the pre-fitted state the two detents 30 are arranged on both sides of the projecting region 31 and thereby bring about an additional securing of the blocking element 3 in the peripheral direction 16, and namely both in the withdrawal direction 18 and also in the insertion direction 32 indicated by an arrow in FIG. 2.

Figure 4:
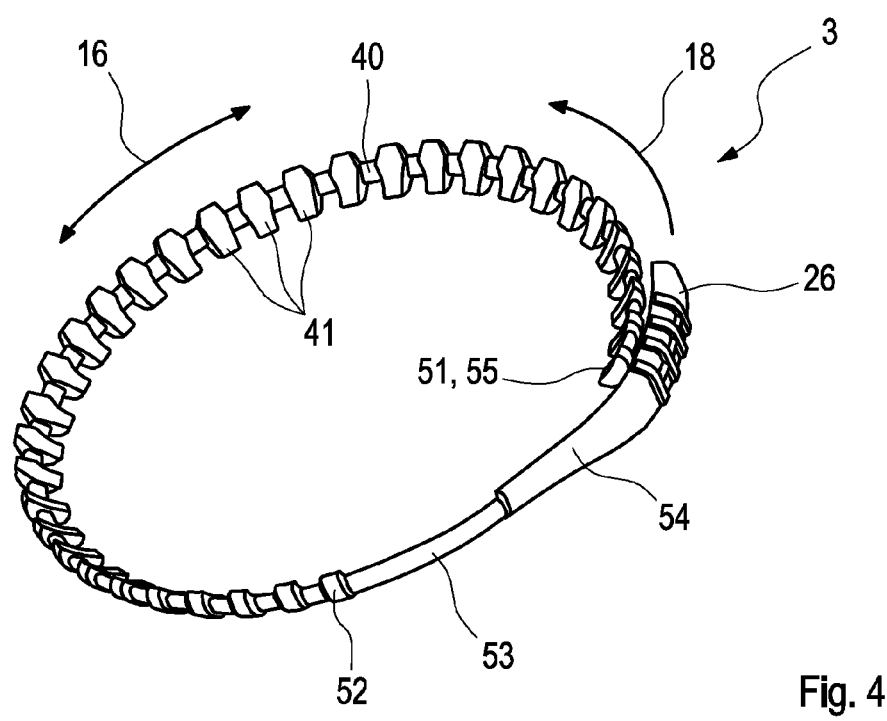

As can be seen for example from FIGS. 4, 8 and 9, the end section 26 of the blocking element 3, lying on the exterior, can be equipped with radial projections 33 or respectively elevations 33, which can be configured for example in the manner of a ribbing. For this, the projections 33 extend in axial direction 22 or in peripheral direction 16. Through these projections 33, the manual gripability of the section 26 is significantly improved. Furthermore, additionally or alternatively to such projections 33, according to FIG. 8 in the end section 26 lying on the exterior, and in particular in the axially protruding region 31, at least one radial slot 34 can be provided. This slot 34, as the slot 28 shown in FIG. 9, can be designed as a tool access, in order for example to be able to move the end section 26 axially out from its securing by means of a flat screwdriver.

In FIG. 2, in addition a cover 35, which can be optionally provided, is indicated by a broken line. This cover 35 is situated on the outside of the housing 2. It can be applied externally onto the pocket 21 or can be formed integrally thereon. In the pre-fitted state, this cover 35 can cover the blocking element 3 radially at least in the region of the housing opening 13. In the example which is shown, the cover 35 also covers the securing device 17 at least partially. Alternatively, it is likewise possible to arrange the cover 35 with respect to the securing device 17 on the opposite side of the housing opening 13 on the housing 2, or respectively to form it integrally thereon. Alternatively, it is likewise possible to design the cover 35 as a separate component with respect to the housing 2. In particular, the cover 35 can then be designed as a clip which is able to be arranged on the housing 2, in particular in the region of the housing opening 13, for example by gripping, elastic clip arms to engage behind the housing opening 13 in radial direction around an edge of the housing opening 13.

As can be seen from the embodiments shown here, the housing opening 13 can be greater in the peripheral direction 16 than in the axial direction 22. In particular, the housing opening 13 at least in the peripheral direction 16 is at least two times greater than in the axial direction 22. Hereby, a bending stress of the blocking element 3 can be reduced on a tangential withdrawal from the housing opening 13. Expediently, the housing opening 13 in the peripheral direction 16 can be equal in size to the end section 26 of the blocking element 3 lying on the exterior in the pre-fitted state. The dimension in the peripheral direction 16 of the housing opening 13 on the one hand and of the end section 26 lying on the exterior, on the other hand, are identical or approximately identical here within the framework of conventional manufacturing tolerances, wherein dimensional variations of +/−10% are able to be tolerated.

In accordance with a preferred embodiment, the housing opening 13 can have a first end 36, which is arranged in the pre-fitted state distally relative to an end 37 of the blocking element 3 lying on the interior. This first end 36 of the housing opening 13 is configured as a radially-running first edge, which leads from the inner groove 6 directly radially to the outer side of the housing 2. In other words, the housing opening 13 is delimited distally to the end 37 of the blocking element 3, lying on the interior, with a radially oriented edge, which is formed by the first end 36. In addition, the housing opening 13 has a second end 38, which in the pre-fitted state is arranged proximally with respect to the end 37 of the blocking element 3 lying on the interior. This second end 38 forms here a radially-running second edge of the housing opening 13, which extends likewise from the inner side of the housing 2 directly radially to the outer side of the housing 2. Therefore, here also the edge of the housing opening 13 proximal to the end 37 lying on the interior, i.e. the second end 38 is oriented radially.

Expediently, the said second edge 38 or respectively the second end 38 of the housing opening 13 can have a transverse web 39 which delimits the inner groove 6 in the peripheral direction towards the housing opening 13. The transverse web 39 thereby forms a stop for the blocking element 3 in the insertion direction 32.

Figure 10:
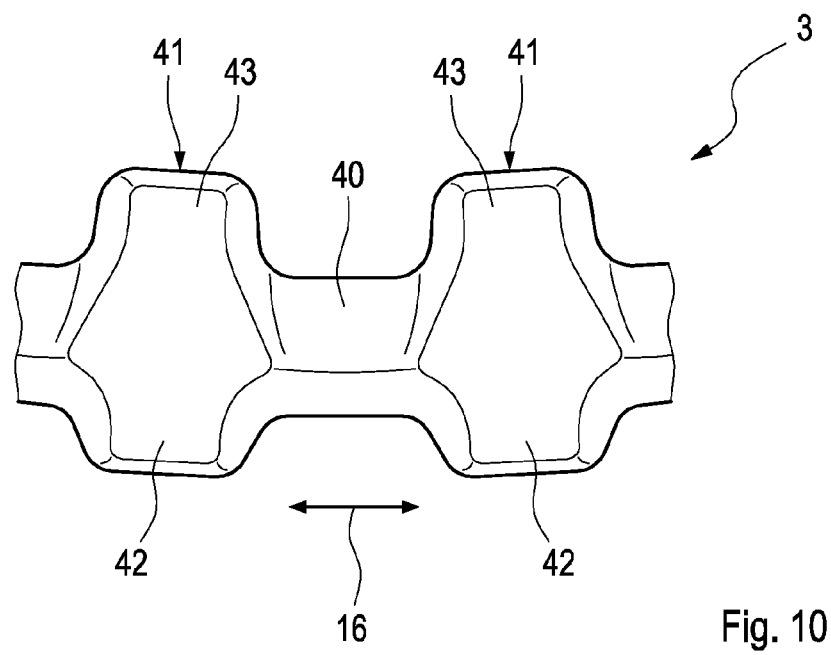
Figure 11:
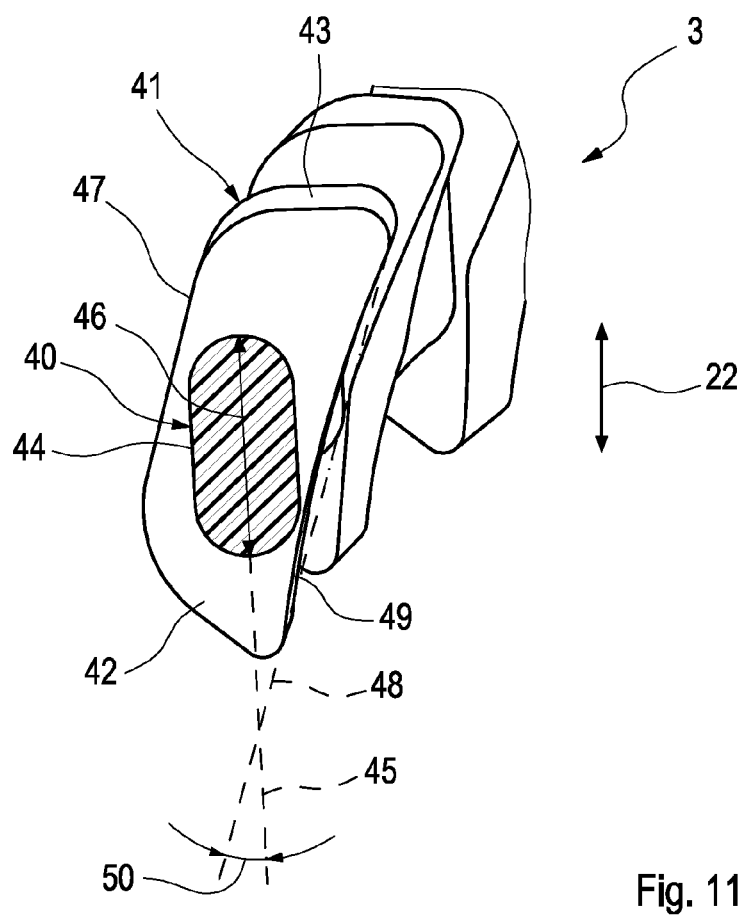
Figure 12:
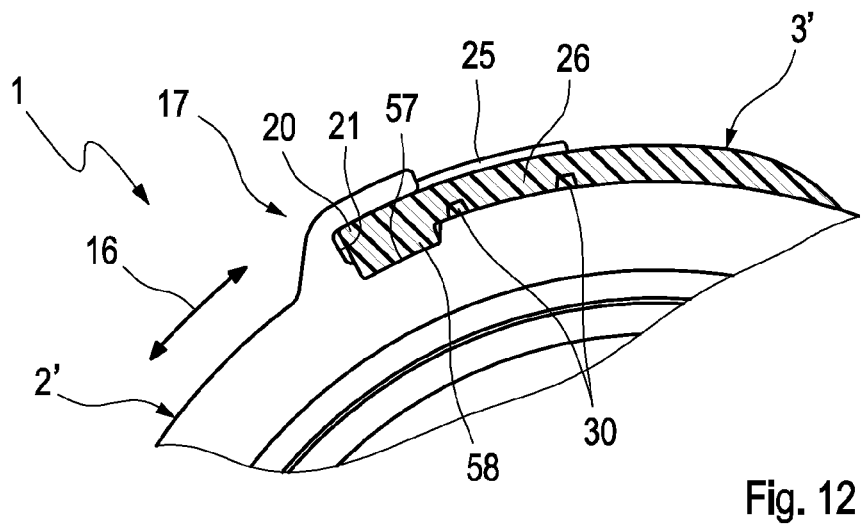

As can be seen in particular from FIGS. 4, 10 and 11, the blocking element 3 in the embodiments shown here has a band-shaped core 40 and several teeth 41, which are arranged adjacent to each other in the peripheral direction 16 and along the core 40. The teeth 41 have here respectively an outer tooth section 42 and an inner tooth section 43. In the inserted state of the insertion section 4, the outer tooth sections 42 interact with the inner groove 5 of the insertion section 4, whilst the inner tooth sections 43 interact with the outer groove 6 of the housing 2. These inner tooth sections 43 and the outer tooth sections 42 protrude from the core 40 at opposite sides. In so doing, they protrude substantially axially from the core 40 in accordance with FIG. 11.

At least between adjacent teeth 41 in accordance with FIG. 1, the core 40 has a core profile 44 in cross-section which has a principal direction 45. The core principal direction 45 is determined or respectively defined here by a maximum diameter 46 of the core profile 44. In contrast to this, the teeth 41 have respectively in cross-section a tooth profile 47 which has a tooth principal direction 48, wherein this tooth principal direction 48 is determined or respectively defined by a tooth flank 49 of the respective tooth 41 lying radially on the interior. The tooth principal direction 48 corresponds here substantially to a straight line, on which the said inner flank 49 comes to lie at least two points or in a defined in a laminar manner.

The blocking element 3 is now produced in accordance with FIG. 11 so that the core principal direction 45 forms an angle 50 with the tooth principal direction 48. In other words, the core principal direction 45 is inclined with respect to the tooth principal direction 48. As can be seen, both the tooth principal direction 48 and also the core principal direction 45 are inclined with respect to the axial direction 22. Preferably, the core principal direction 45 is inclined here in the direction towards the axial direction 22 with respect to the tooth principal direction 48. Preferably, the angle 50 between the core principal direction 45 and the tooth principal direction 48 is selected to be so great that the axial direction 22 lies between the tooth principal direction 48 and the core principal direction 45.

In accordance with FIG. 2, the blocking element 3 has the end section 26, which in the pre-fitted state lies on the outside of the housing 2. The dimensioning of the blocking element 3 is selected to be so great in the peripheral direction 16 that the end section 26, lying on the exterior, in the pre-fitted state overlaps in the peripheral direction 16 an end section 51 of the blocking element, lying on the interior, which has the end 37 lying on the interior, and which lies in the inner groove 6. Hereby, a radial overlapping is produced between the end section 51 lying on the interior and the end section 26 lying on the exterior.

In accordance with FIG. 4, the end section 26 lying on the exterior can have an enlarged profile with respect to the core 40. Hereby, the grip of the end section 26 lying on the exterior is improved, which simplifies the manual actuation of the securing element 3 for withdrawing from the grooves 5, 6.

In accordance with FIGS. 2 and 4, the core 40 can have a toothless core section 53 between the end section 26 lying on the exterior and a first tooth 52, which toothless core section is so great that it extends into the inner groove 6. According to FIG. 2, the entire toothless core section 53 lies inside the inner groove 6.

In accordance with FIGS. 2 and 4, the blocking element 3 can have a twisted transition section 54 between the end section 26 lying on the exterior and the region running in the interior of the housing 2 or respectively in the inner groove 6. This twisted transition section 54 is distinguished in that in this transition section 54 a principal direction of the blocking element profile, not designated in further detail, proceeding from an orientation running parallel to the core principal direction 45, straightens itself in the direction towards the end section 26 lying on the exterior with respect to the axial direction 22, and namely preferably to such an extent that the principal direction of the blocking element profile in the end section 26 lying on the exterior is oriented substantially parallel to the axial direction 22. Hereby, the blocking element 3 can run in an inclined manner with respect to the axial direction 22 in the region of its core 40, whereas in the region of the end section 26 it runs parallel to the axial direction 22. This makes possible a particularly flat and compact type of construction for the connection device 1.

The first tooth 52 in the withdrawal direction 18 can have an introduction bevel, which facilitates the introduction of the blocking element 3 into the housing 2, and/or a withdrawal bevel, which facilitates the withdrawal of the blocking element 3 from the housing 2. Additionally or alternatively, a last tooth 55 in the withdrawal direction 18 can have an introduction bevel facilitating the introduction of the blocking element 3 into the housing 2, and/or a withdrawal bevel facilitating the withdrawal of the blocking element 3 from the housing 2.

As can be seen in particular from FIG. 11, the core 40 can preferably be arranged eccentrically to the teeth 41 with respect to the inner and outer tooth sections 42, 43. In the example of FIG. 11, the core profile 44 is displaced downwards from the centre with respect to the tooth profile 47. This corresponds to a displacement or eccentricity of the core 40 in the direction of the outer tooth sections 42, which interact with the inner groove 6. Hereby, the blocking element 3 can yield elastically more easily into the inner groove 6 on insertion of the insertion section 4.

It is noteworthy here in addition that expediently the dimensions in the peripheral direction 16 of the housing opening 13, of the toothless core section 53, of the twisted transition section 54 and of the end section 26 lying on the exterior are selected to be respectively approximately equal in size.

In addition, it can be seen from FIG. 10 that adjacent teeth 41 in the peripheral direction 16 have a comparatively great distance from each other. The said distance corresponds approximately to a tooth width measured in the peripheral direction. Hereby, a particularly high degree of flexibility and stability are produced for the blocking element 3.

Figure 5:
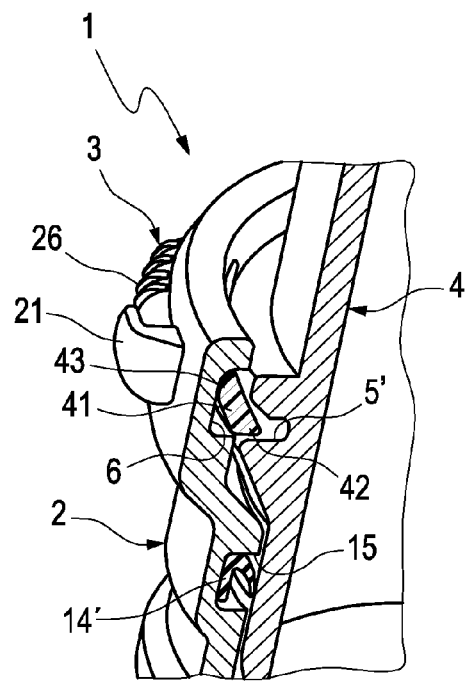
Figure 6:
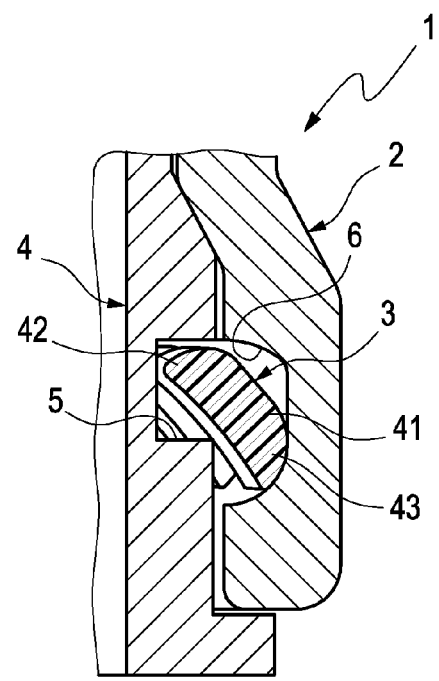
Figure 7:
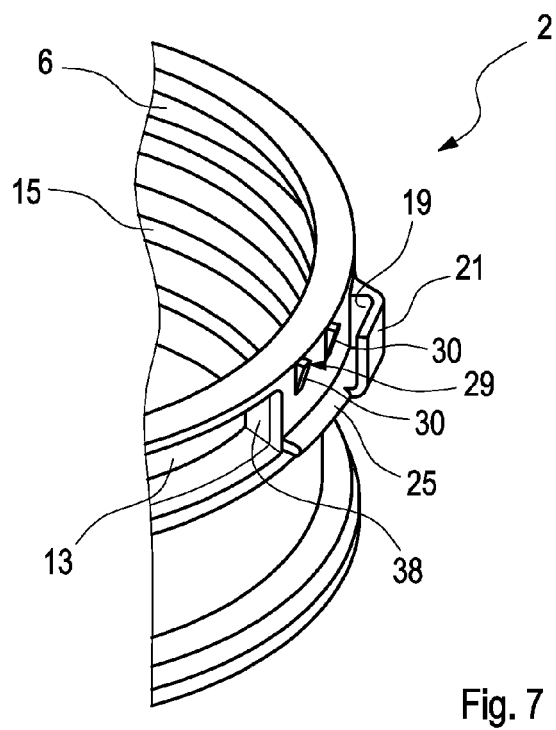

It can be seen from FIGS. 5 and 6 that the blocking element 3, in particular with regard to its inner tooth sections 43, is preferably shaped so that several differently shaped outer grooves 5 can be secured in a sufficiently form-fitting manner. Thus, FIGS. 5 and 6 show two different embodiments for the insertion sections 4 or respectively for the outer grooves 5 formed thereon. FIG. 5 shows in addition an alternative seal 14'.

Expediently, the blocking element 3 can be injection-moulded from plastic, wherein this injection moulded part comprises both the core 40 and also the teeth 41. Basically, the blocking element 3 can be produced here from a homogeneous plastic, so that the core 40 and the teeth 41 have no material differences. Furthermore, it is, however, also possible to produce the blocking element 3 from plastic, so that it can be fibre-reinforced at least in the region of the core 40, wherein the respective reinforcing fibres, such as e.g. glass fibres or carbon fibres, preferably extend in the peripheral direction. Alternatively, an embodiment is also conceivable in which the blocking element 3 is produced in that the teeth 41 are injected onto the core 40. Whilst the teeth 41 preferably consist of plastic, the core 40 can then basically likewise be produced from plastic, preferably from a different plastic than the teeth 41, or from a different material. The same then also applies for the end section 26 lying on the exterior, which can likewise be injected onto the core 40 or can be formed integrally thereon.

As soon as the insertion section 4 is inserted into the connection device 1, the housing 2 and the insertion section 4 are connected with each other fluidically. Hereby in addition a connection arrangement 56 is produced, which comprises the connection device 1 and the insertion section 4 inserted therein.

In the example which is shown, the depression 57 is situated inside the mounting pocket 21, so that it is radially overlapped.

Figure 13:
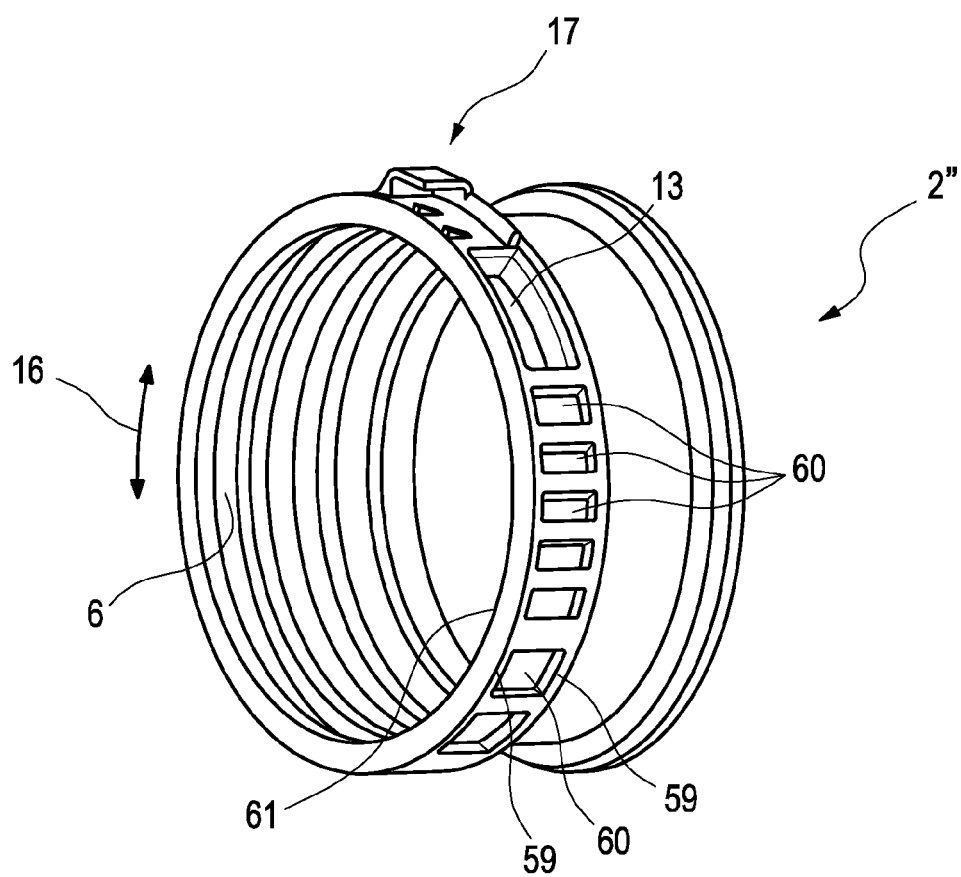
Figure 14:
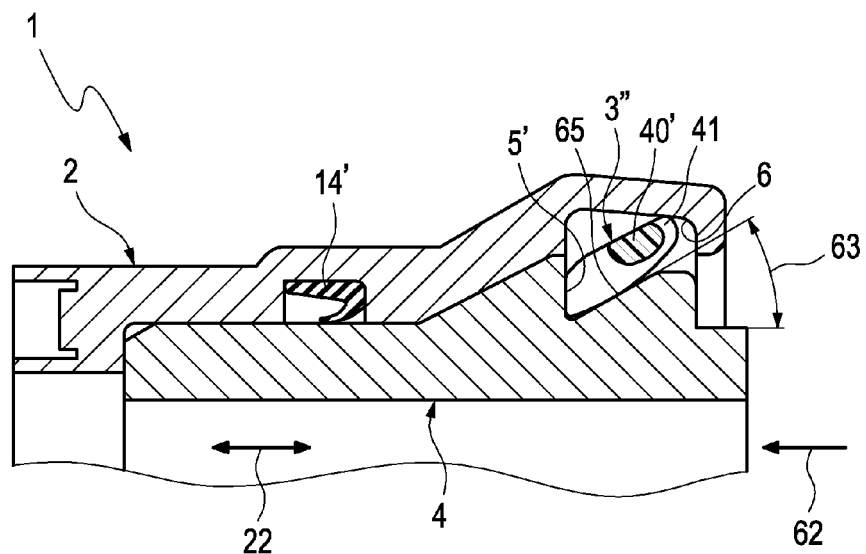

In accordance with FIG. 13, the housing 2 can be reinforced by means of at least one peripheral rib 59. The respective peripheral rib 59 extends here in the peripheral direction 16, expediently closed in an annular shape. The respective peripheral rib 59 is arranged here on the outside of the housing 2. In the example, two such peripheral ribs 59 are provided, which are arranged spaced apart from each other axially. Furthermore, in the example also several longitudinal ribs 60 are provided, which are likewise arranged on the outside of the housing 2 and extend here in the longitudinal direction of the housing 2. Expediently, the longitudinal ribs 60 are dimensioned here so that they connect the two peripheral ribs 59 with each other. The one peripheral rib 59, facing the observer in FIG. 13, is arranged at the free end of the housing 2, which has an insertion opening 61 for insertion of the insertion section 4. In addition, the two peripheral ribs 59 are positioned on the housing 2 here preferably so that they are situated axially on both sides of the inner groove 6, so that the inner groove 6 is positioned axially between the two peripheral ribs 59. Hereby, the housing 2 is reinforced in the region of the inner groove 6.

In accordance with FIGS. 14 to 17, the outer groove 5 of the insertion section 4 can have a ramp profile 65 transversely to the peripheral direction 16, i.e. in the axial direction 22 or longitudinal section 22. The ramp profile 65 is oriented here so that it slopes down in an insertion direction 62 of the insertion section 4, indicated by an arrow. The insertion direction 62 defines here the relative movement of the insertion section 4 relative to the housing 2 on insertion of the insertion section 4 into the housing 2.

Through the ramp shape of the outer groove 5, the risk is to be reduced that the teeth 41 of the blocking element 3 straighten themselves too much in the case of a tractive force between the insertion section 4 and the housing 2, which would lead to high radial forces. The ramp profile 65 causes the teeth 41 to largely remain and be supported in a predetermined alignment. For example, the ramp profile 65 has a ramp angle 63 which is at a maximum 45°.

Figure 15:
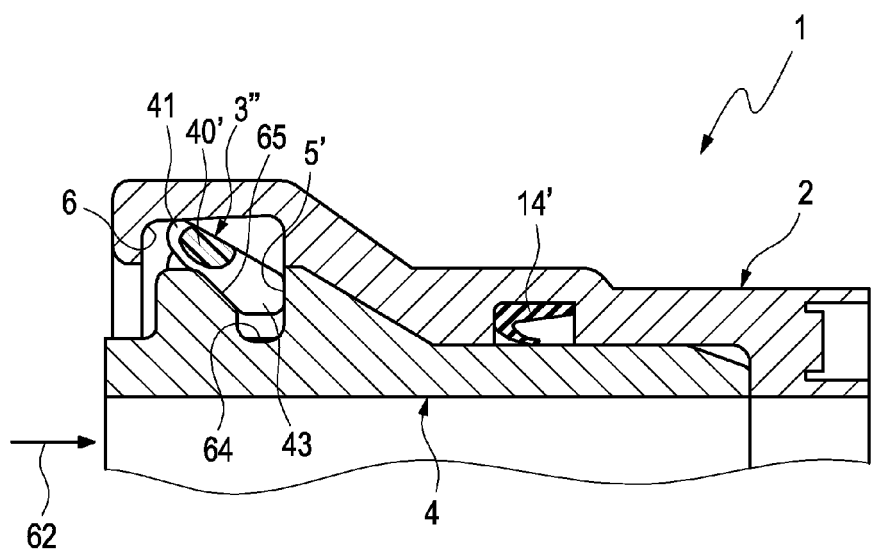

In the embodiment shown in FIG. 15, the outer groove 5 is shaped geometrically so that it has a depression 64 on an end of the ramp profile 65 lying on the interior. This depression 64 is dimensioned here expediently so that the teeth 41 of the blocking element 3 are arranged in the depression 64 or respectively in the region of the depression 64 standing freely radially. This means that the inner tooth sections 43 of the teeth 41 can project partially into the depression 64, but are spaced apart radially with respect to the base of the depression 64 lying radially on the interior. This structural form has the consequence that the teeth 41 can rest radially only on the ramp profile 65, so that the straightening tendency of the teeth 41 is additionally reduced.

Figure 16:
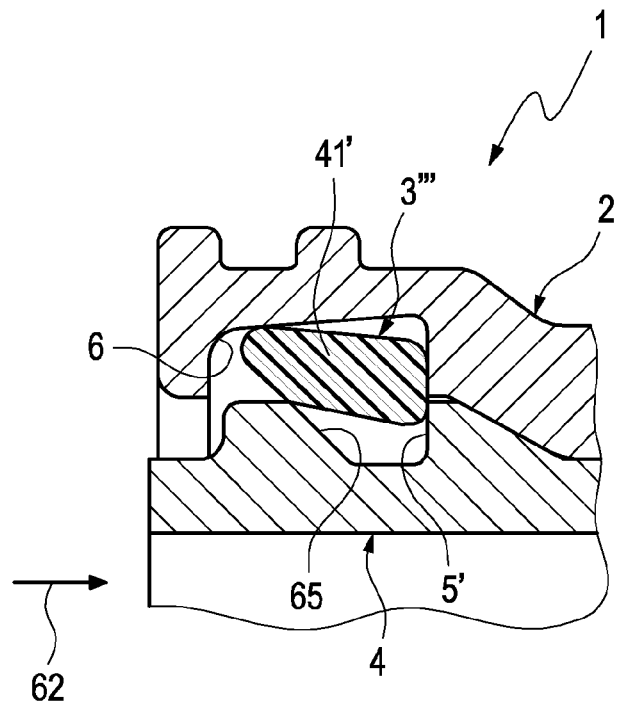
Figure 17:
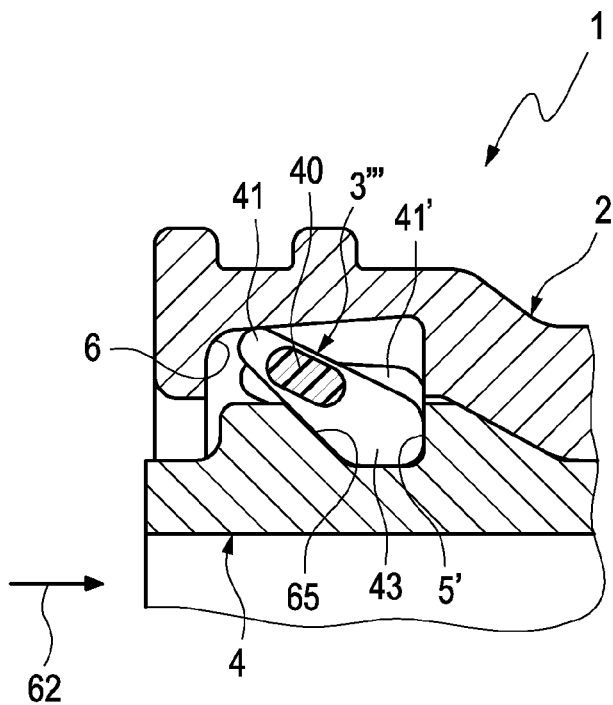

In accordance with FIGS. 16 and 17, according to a particularly advantageous embodiment, at least one "special" tooth 41' can be different with respect to the other "normal" teeth 41 as regards its geometry and/or as regards its alignment with respect to the core 40, i.e. can have a different angle between the tooth principal direction 48 and the core principal direction 45. In the example which is shown of FIGS. 16 and 17, the said special tooth 41' is different with respect to the other normal teeth 41 both as regards its geometry and also as regards its alignment. Expediently, several such special teeth 41' can be provided along the blocking element 3, but in total fewer than half of all the teeth 41, 41'. For example, only 10% or a maximum of 10% of the teeth 41, 41' are configured or respectively arranged differently from the remaining normal teeth 41. These different, special teeth 41' are expediently arranged distributed in the peripheral direction preferably spaced apart from each other uniformly along the blocking element 3".

As can be seen from FIGS. 16 and 17, the respective special tooth 41' is configured or respectively arranged so that in the pre-fitted state and in particular also in the inserted state in the insertion direction 62 in the inner groove 6 it rests axially on the housing 2. Hereby, on insertion, it is prevented that the blocking element 3 moves axially relative to the housing 2, such that the other normal teeth 41 protrude with their inner tooth sections 43 axially over the inner groove 6 and thereby can jam between the housing 2 and the insertion section 4. In particular, it can be seen readily from FIG. 17 that in the pre-fitted state or respectively in the inserted state, the normal teeth 41 rest with their inner tooth section 43 exclusively in the outer groove 5 on the insertion section 4, whereas the special teeth 41' rest axially in the inner groove 6 on the housing 2 and in the example in addition in the outer groove 5 on the insertion section 4.

The invention claimed is:

1. A connection device, comprising:
   an insertion section having an annular outer groove,
   a housing configured to receive the insertion section,
   a blocking element configured to lock the insertion section in the housing,
   wherein the blocking element for locking the insertion section in the housing engages into the annular outer groove and into an annular inner groove formed in the housing,
   wherein the blocking element is configured to be withdrawn through a housing opening substantially tangentially to the grooves,
   wherein, in a pre-fitted state, the blocking element is pre-fitted in the inner groove with elastic deflection, and the insertion section is configured to be inserted into the housing,
   wherein the blocking element has a band-shaped core and a plurality of teeth arranged adjacent in the peripheral direction along the core, each of the teeth including an outer tooth section configured to interact with the inner groove in the pre-fitted state and an inner tooth section configured to interact with the outer groove in an inserted state,
   wherein the inner and outer tooth sections protrude from the core on opposite sides,
   wherein the core has a core profile in a cross-section at least between adjacent teeth, which core profile has a core principal direction determined by a maximum diameter,
   wherein the teeth in the cross-section respectively have a tooth profile which has a tooth principal direction determined by an inner flank of the teeth lying radially on an interior of the outer tooth section,
   wherein the core principal direction is inclined with respect to the tooth principal direction, and
   wherein the housing includes a securing device arranged on the outside of the housing, the securing device including an outer stop lying opposite an end of the blocking element in the peripheral direction in the pre-fitted state, and a mounting pocket in which the end of the blocking element is inserted in the pre-fitted state.

2. The connection device according to claim 1, wherein the tooth principal direction is inclined with respect to an axial direction, and wherein the core principal direction is inclined with respect to the tooth principal direction in the direction towards the axial direction.

3. The connection device according to claim 1, wherein the blocking element has a first end section, lying on an exterior of the housing in the pre-fitted state.

4. The connection device according to claim 3, wherein the first end section in the pre-fitted state, overlaps a second end section of the blocking element lying on the interior of the housing in the peripheral direction in the inner groove.

5. The connection device according to claim 3, wherein the first end section, lying on the exterior of the housing, has a cross-sectional profile which is enlarged with respect to the core.

6. The connection device according to claim 3, wherein the core has a toothless core section extending into the inner groove between the first end section up to the first tooth.

7. The connection device according to claim 3, wherein the blocking element has a twisted transition section between the first end section and the region running in the inner groove, wherein the principal direction of the blocking element profile straightens itself with respect to the axial direction in the transition section starting from the core principal direction in the direction towards the first end section.

8. The connection device according to claim 7, wherein the principal direction of the blocking element profile in the first end section extends substantially parallel to the axial direction.

9. The connection device according to claim 1, wherein the plurality of teeth include a first tooth and a last tooth in a withdrawal direction, wherein at least one of the first tooth and the last tooth at least one of an introduction bevel facilitating the introduction of the blocking element and a withdrawal bevel facilitating the withdrawal of the blocking element.

10. The connection device according to claim 1,
wherein the core is arranged eccentrically to the teeth with regard to the inner and outer tooth sections, wherein the core is arranged offset in the direction of the outer tooth sections, and
wherein adjacent teeth are spaced apart from each other in the peripheral direction by approximately one tooth width measured in the peripheral direction.

11. The connection device according to claim 1, further comprising a cover arranged on the exterior of the housing configured to radially cover the housing opening and a first end section of the blocking element in the pre-fitted state.

12. The connection device according to claim 1, wherein the plurality of teeth include at least one distinct tooth having at least one of a distinct geometry and distinct alignment with respect to the core as compared to the other teeth, wherein the at least one distinct tooth is configured to rest axially in the pre-fitted state in an insertion direction of the insertion section in the inner groove, wherein the at least one distinct tooth is configured to rest in the inserted state with its inner tooth section in the inner groove, the other teeth resting with their respective inner sections in the outer groove.

13. The connection device according to claim 1, wherein the outer groove has a ramp profile extending transversely to the peripheral direction and sloping down in the insertion direction of the insertion section.

14. The connection device according to claim 13, wherein the outer groove defines a depression at an end of the ramp profile lying on the interior of the housing, which depression is dimensioned so that the respective inner tooth sections are arranged radially in the depression, wherein the depression is dimensioned smaller in the ramp profile than the inner tooth sections.

15. The connection device according to claim 1,
wherein the exterior of the housing has at least one peripheral rib extending in peripheral direction,
wherein the at least one peripheral rib is arranged at an end of the housing having an insertion opening for receiving the insertion section.

16. The connection device according to claim 1, wherein the exterior of the housing has at least two peripheral ribs spaced apart from each other axially, the inner groove being arranged axially between two such peripheral ribs.

17. The connection device according to claim 16, wherein the exterior of the housing has a plurality of longitudinal ribs extending in longitudinal direction connecting the at least two peripheral ribs with each other.

18. The connection device according to claim 1, wherein the housing defines a depression inside the mounting pocket, and the blocking element has a projection protruding radially inwardly on the end of the blocking element and engaging in the depression in the pre-fitted state.

19. The connection device according to claim 1, wherein the securing device includes at least one of a web and a detent device, the web extending from the mounting pocket in a peripheral direction towards the housing opening, and the detent device including at least one detent to impede an axial adjustment of an end section of the blocking element.

20. The connection device according to claim 1, wherein the securing device includes a web extending from the mounting pocket in a peripheral direction towards the housing opening, and an end section of the blocking element has an axially oriented indentation such that a slot is formed between the end section and the web in the pre-fitted state.

* * * * *